United States Patent [19]
Crow

[11] Patent Number: 6,039,173
[45] Date of Patent: Mar. 21, 2000

[54] METHOD OF SUPPORTING A PAIR OF EYEGLASSES

[76] Inventor: Steve A. Crow, 5041 Senac Dr., Metairie, La. 70003

[21] Appl. No.: 09/110,557

[22] Filed: Jul. 6, 1998

[51] Int. Cl.$^7$ ............................. A45C 11/04; A44B 21/00
[52] U.S. Cl. ................................. 206/5; 24/3.3; 211/85.1; 248/902
[58] Field of Search ......................... D3/265, 266; 206/5; 24/3.3; 211/85.1; 248/902

[56] References Cited

U.S. PATENT DOCUMENTS

| | | | |
|---|---|---|---|
| 177,415 | 5/1876 | Miser | 206/5 |
| D. 182,144 | 2/1958 | Pretz | D3/266 |
| D. 321,199 | 10/1991 | Souisa et al. | |
| D. 367,555 | 3/1996 | Lagas | |
| D. 378,023 | 2/1997 | Grassey | D3/266 |
| 2,120,690 | 12/1938 | Fischer | |
| 4,239,167 | 12/1980 | Lane | |
| 4,452,354 | 6/1984 | Tabachnick | |
| 4,894,887 | 1/1990 | Ward, II | 24/3.3 |
| 5,046,696 | 9/1991 | Lee | |
| 5,414,906 | 5/1995 | Kren | 24/3.3 |
| 5,626,224 | 5/1997 | Clark et al. | 206/5 |

*Primary Examiner*—Bryon P. Gehman
*Attorney, Agent, or Firm*—Joseph T. Regard, Ltd

[57] ABSTRACT

A holder for eyeglasses, which may include corrective lenses, sunglasses, or the like. The preferred embodiment of the present invention contemplates a holder having a generally rectilinear body structure having a longitudinal axis, a length, front, back, and first and second side walls, a top and a bottom, and a conduit formed therethrough for the passage of the eyeglass's earpiece shaft therethrough. To facilitate a secure storage of the glasses, the end of the temple bar which engages the frame at the endpiece engages an open area formed in the front face of the holder body which terminates in sloped fashion to a point situated generally at the longitudinal axis, the open face configured to engage a wide variety of configuration temple bars. In use, the holder is situated such that its longitudinal axis is in a generally vertically aligned fashion, and is adhered, via adhesive strip, for example, to a generally vertically situated support surface, which may include a computer monitor, vehicle dashboard or other like surface. The user then deposits the free end of one of the temple bar of the eyeglasses to be stored into the conduit formed in the holder, allowing the distal end of the temple bar to fold about the open face formed at the front of the holder, and allowing the sloped contour of the open face, with gravity, to urge the supported eyeglasses to migrate to the generally longitudinal center of the support, thereby securely supporting same.

4 Claims, 2 Drawing Sheets

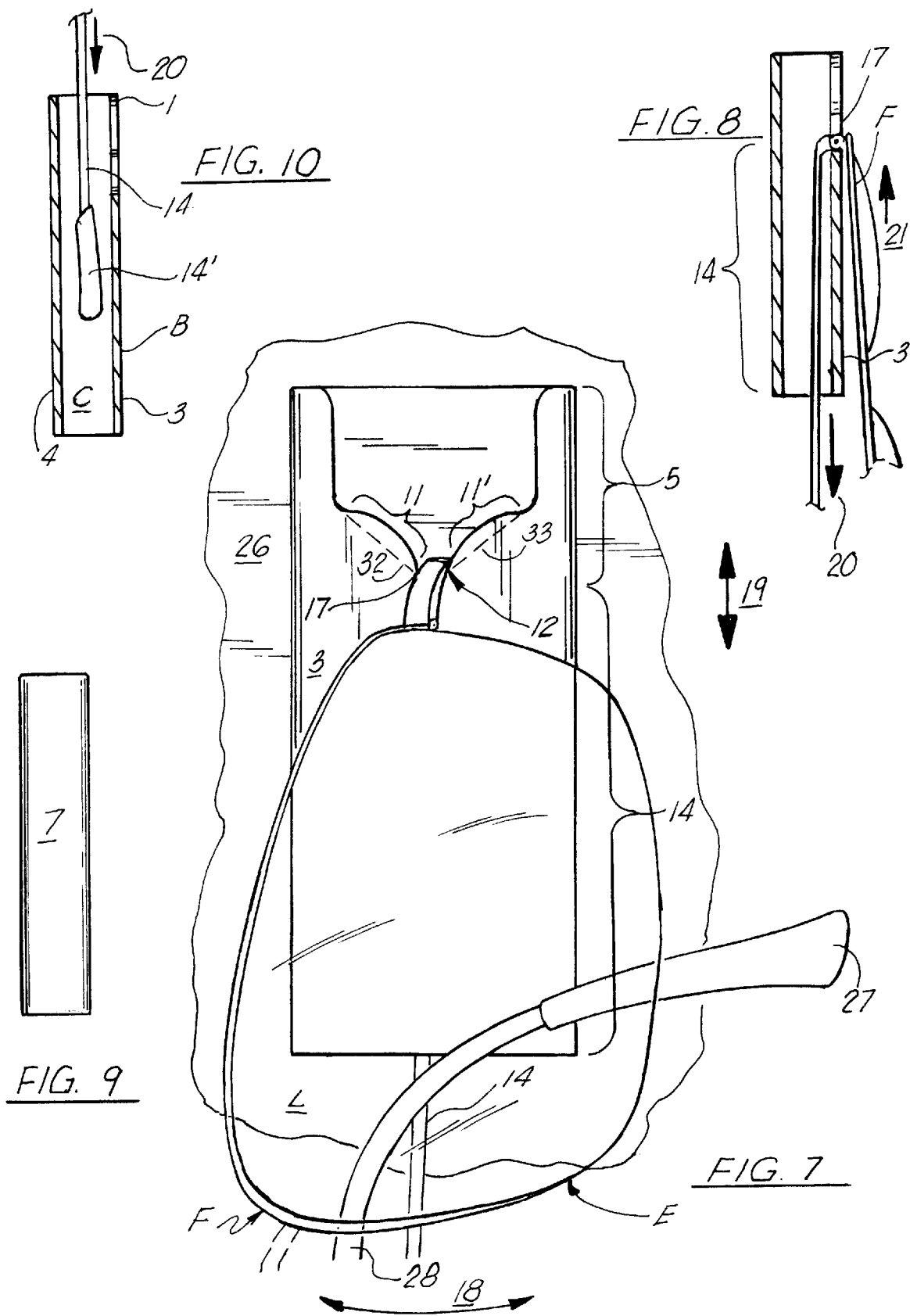

6,039,173

METHOD OF SUPPORTING A PAIR OF EYEGLASSES

TECHNICAL FIELD OF THE INVENTION

This invention relates to receptacles, and in particular to a holder for eyewear or eyeglasses, which may include corrective lenses, sunglasses, or the like.

The preferred embodiment of the present invention contemplates a holder having a generally rectilinear body structure having a longitudinal axis, a length, front, back, and first and second side walls, a top and a bottom, and a conduit formed therethrough for the passage of the eyeglass's earpiece shaft therethrough.

To facilitate a secure storage of the glasses, the end of the temple bar which engages the frame at the endpiece engages an open area formed in the front face of the holder body which terminates in sloped fashion to a point situated generally at the longitudinal axis, the open face configured to engage a wide variety of configuration temple bars.

In use, the holder is situated such that its longitudinal axis is in a generally vertically aligned fashion, and is adhered, via adhesive strip, for example, to a generally vertically situated support surface, which may include a computer monitor, vehicle dashboard or other like surface. The user then deposits the free end of one of the temple bar of the eyeglasses to be stored into the conduit formed in the holder, allowing the distal end of the temple bar, which includes the butt-strap which engages the endpiece of the eyeglass frame, to fold about the open face formed at the front of the holder, and allowing the sloped contour of the open face, with gravity, to urge the supported eyeglasses to migrate to the generally longitudinal center of the support, thereby securely supporting same.

BACKGROUND OF THE INVENTION

While the prior art includes many variations of a holder or receptacle for eyeglasses or the like, none are believed to teach, contemplate, or otherwise suggest the present invention.

During the course of the search the following patents were deemed at least generally pertinent to the present invention;

| Patent Number | Inventor(s) | Date of Issue |
| --- | --- | --- |
| 5613661 | Seach | 03/25/97 |
| 5046696 | Lee | 09/10/91 |
| 4771515 | Guarro | 09/20/88 |
| 4452354 | Tabachnick | 06/05/84 |
| 4239167 | Lane | 12/16/80 |
| 3946877 | Galicia | 03/30/76 |
| 3825214 | Ciolfi | 07/23/74 |
| 3810596 | Elm | 05/14/74 |
| 3259348 | Dann | 07/05/66 |
| 3148812 | Hilsinger, Jr. | 09/15/64 |
| 3123208 | Barnun et al | 03/03/64 |
| 3119429 | Stiller et al | 01/28/64 |
| 3101869 | Baker | 08/27/63 |
| 3052002 | Lesher | 09/04/62 |
| 2850152 | Marrufo | 09/02/58 |
| 2551913 | Toby | 05/08/51 |
| 2512031 | Marcoux | 06/20/50 |
| 2368868 | James | 02/06/45 |
| 2102690 | Fischer | 12/21/37 |
| 1834151 | Gordon | 12/01/31 |
| 1748430 | Stringham | 02/25/30 |
| 1568889 | Eliasson | 01/05/26 |
| 1486472 | Windecker | 03/11/24 |
| 1474308 | Wimberly | 11/13/23 |
| 794065 | Woodworth | 07/04/05 |
| 652245 | Cameron | 06/26/00 |
| Des 367555 | Lagas | 03/05/96 |
| Des 321199 | Soulsa et a | 10/29/91 |

U.S. Pat. No. 4,452,354 illustrates a tube-type eyeglass holder having a generally rectangular body of "flexible plastic" having a conduit therethrough for supporting a temple bar, the body having a back, a front, and sidewalls, the back including an adhesive for affixing the unit to a vertical support surface, but this device is in the general form of a tube, and lacks an engagement area configuration designed to better isolate the supported eyeglasses, when compared to the present, applied for invention.

U.S. Pat. No. 5,046,696 teaches a loop-type eyeglass holder having a backplate having a support member emanating therefrom, the support member having first and second sloping front walls terminating in a generally horizontal support bar. '696 contemplates a loop type of holder, which is to say that only a small portion of the temple bar is isolated by the '696 holder, thereby retaining same in a loose fashion; under bumpy conditions, the eyewear would likely bounce around considerably, possibly resulting in the eyewear being jarred from the holder, or perhaps becoming scratched or otherwise damaged due to a collision of the eyewear with the support surface or holder.

U.S. Pat. Nos. 4,239,167 and Des 321, 199 teach loop-type holding receptacles for eyeglasses or the like.

Unlike the present invention, the prior art fails to contemplate an eyeglass holder which can isolate a length of the temple bar as is done in a tube-type holder, while providing an engagement area to better retain the supported eyewear in a particular location on the holder, as is contemplated in some degree in the loop-type holders, albeit different than that contemplated in the present invention.

GENERAL SUMMARY DISCUSSION OF THE INVENTION

Unlike the prior art, the present invention contemplates an eyewear holder for glasses or the like which is easily installed and utilized, while effective in supporting eyewear in a variety of operational environments, in a manner which is relatively inexpensive, aesthetically pleasing, and efficient in operation.

As indicated, the preferred embodiment of the present invention contemplates a holder having a generally rectilinear body structure having a longitudinal axis, a length, front, back, and first and second side walls, a top and a bottom, and a conduit formed therethrough for the passage of the eyeglass's earpiece shaft therethrough.

An open area is formed in the front face of the holder body is sloped to a point situated generally at the longitudinal axis to engage a wide variety of configuration temple bars, thereby facilitating secure storage of the glasses even in vehicles including autos, boats, and the like.

Installing the unit is simply a matter of placing the body of the unit in generally vertical fashion, exposing the adhesive back (although hook and loop, magnet, or other mounting means may be provided), and adhering same to any vertical support surface, for example, which may include a computer monitor, vehicle dashboard, desk, or other surface.

The user may then deposit the free end of either temple bar of the eyeglasses to be stored into the conduit formed in the holder, allowing the distal end of the temple bar, which includes the butt-strap which engages the endpiece of the eyeglass frame, to fold about the open face formed at the front of the holder, and allowing the sloped contour of the open face, with gravity, to urge the supported eyeglasses to migrate to the generally longitudinal center of the support, thereby securely supporting same.

The present system thereby effectively holds the eyeglasses even under bumpy road or marine conditions, providing a secure, readily available eyewear storage facility which is readily accessible upon demand, the user merely grasping the frame and pulling upward, freeing the retained temple bar and the glasses for use.

It is therefore an object of the present invention to provide an eyewear storage receptacle which is easily mounted and effective in use.

It is another object of the present invention to provide an eyewear holder or the like which is pleasing to the eye, and does not retract from the appearance from the surface upon which it is mounted.

It is another object of the present invention to provide an eyewear holder which is easy to use, yet effectively retains the eyewear even under bumpy conditions.

It is still another object of the present invention to provide an eyewear holder which is able to be utilized with a variety of configurations and sizes of eyewear.

It is another object of the present invention to provide an eyewear holder which is relatively small and simple in design.

Lastly, it is an object of the present invention to provide an eyewear holder which is mountable to a variety of different surfaces in diverse environments, yet effectively retains the eyewear in a safe and easily accessible manner.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 7 is a front view of the invention of FIG. 1, illustrating the unit mounted upon a vertical support surface, and further illustrating in phantom an exemplary pair of eyeglasses supported thereby.

FIG. 8 is a side, partially cross-sectional view of the invention of FIG. 1, illustrating the support of an exemplary pair of eyeglasses in phantom, by the present invention.

FIG. 9 is a side, partially cross sectional view of the invention of FIG. 1, illustrating the removal of the temple bar from the unit, releasing the eyeglasses for use by the user.

FIG. 10 is a side view of the invention of FIG. 1, illustrating the placement of the temple bar into the holder.

DETAILED DISCUSSION OF THE INVENTION

Figure 1:
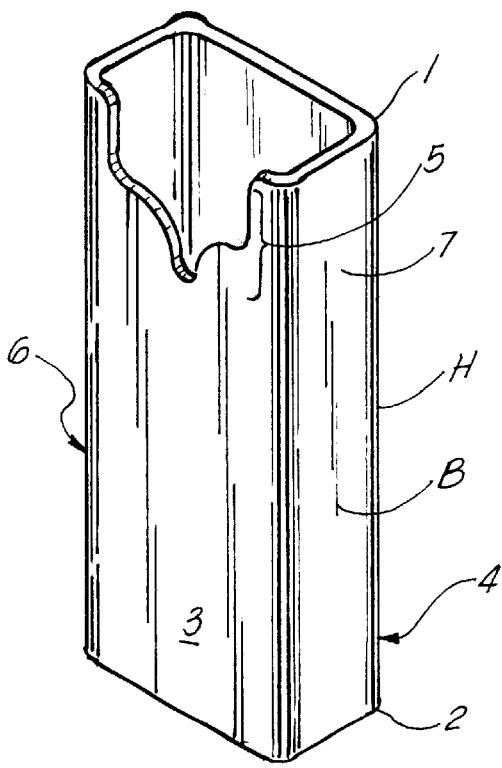
FIG. 1 is a frontal, isometric view of the eyewear holder of the present invention.
Figure 4:
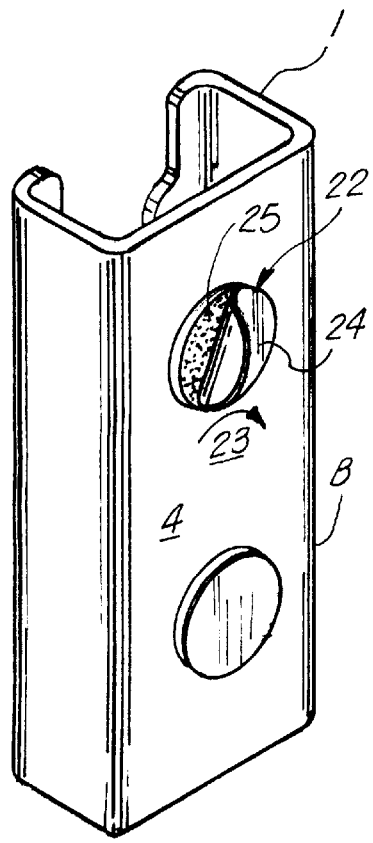
FIG. 4 is a rear, isometric view of the invention of FIG. 1.
Figure 2:
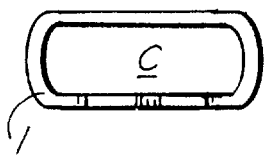
FIG. 2 is a top view of the invention of FIG. 1.
Figure 5:
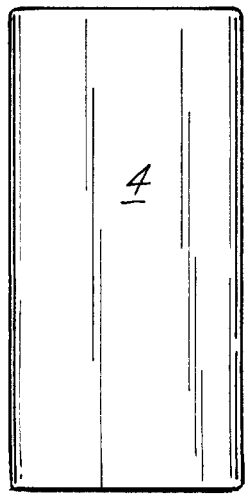
FIG. 5 is a back view of the invention of FIG. 1.

Referring to FIGS. 1, 2, 3, 5, 7, and 9, the eyewear holder H of the present invention comprises a main body B having first 1 and second 2 ends, front 3 and rear 4 sides, and first 7 and second 6 edges, the above forming a generally rectilinear conduit C therebetween running the length of the unit.

Figure 6:
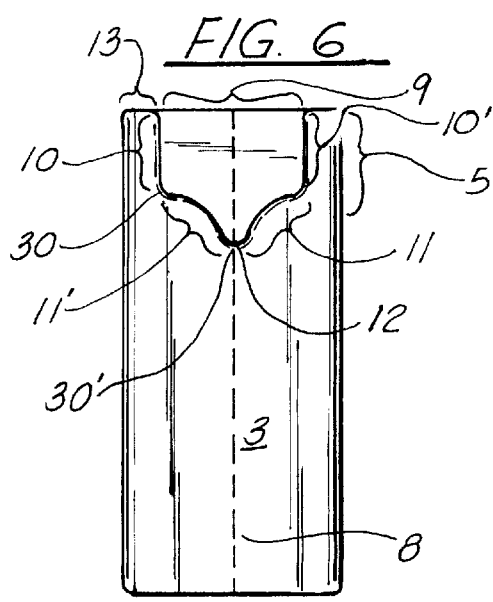
FIG. 6 is a frontal view of the invention of FIG. 1.
Figure 3:
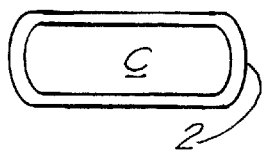
FIG. 3 is a bottom view of the invention of FIG. 2.

The front side 3 has formed therein, adjacent to the first 1 end of the unit, an engagement area 5 configured to receive and retain various size and configuration eyewear. Continuing with FIG. 6, the engagement area 5 formed in the front 3 side of the body B includes an open space 9 situated in spaced relationship 13 from the edges 6, 7, formed via first 10 and second 10' vertical drops centered along the body's longitudinal axis 8, the vertical drops terminating in a centering means for centering the item to be supported, the centering means in the preferred embodiment comprising sloping arcs 11', 11 terminating at point 12, again aligned with longitudinal axis 8. While sloping arcs having an outward radius are shown to facilitate central migration of the unit being supported to point 12, it is indicated that first 32 and second 33 linear sloping edges may also be provided, as well as other possible designs, including arcs having inwardly directed radius.

However, it is averred that the sloping arcs 11, 11', each arc including first 30 and second 30' ends, the first ends situated above the second ends, the second ends terminating at point 12, provide an effective balance of urging the item to be supported to the lower, central support point 12, while effectively retaining same upon reaching point 12, to provide effective support.

Continuing with FIGS. 4, 7, 8, and 10, the rear side 4 of body B includes a holding means, which in the preferred embodiment comprises an adhesive strip 22, but which may likewise include hook and loop fastener, magnet, glue, hanging bracket, or other means of affixing body B to a support.

In use, the backing 24 to adhesive strip 22 is peeled 23 off, exposing adhesive 25; the exposed adhesive is then applied to a support surface 26, ideally, such that the first end 1 is in a generally upwardly directed position, with the body B situated in a generally vertically aligned position, although the unit should work well even in those situations where the body can not be in full vertical alignment. The support surface 26 may include, for example, a computer monitor, automobile dashboard, refrigerator, door, file cabinet, bookshelf, vanity, mirror, or most any generally vertically situated support surface.

The present system is designed to support a pair of eyeglasses, which generally includes a frame F having lens L mounted therein, and first 14 and second 28 temple bars terminating at a butt-strap 16, and connected to the end of frames via hinges; each of the temple bars 14, 28 further having earpieces 14', 27, respectively.

To place the eyeglasses in the holder, the user would grasp the frame of the glasses, and fold the first temple bar such that the earpiece 14' is generally adjacent to the lens, and downwardly direct 20 the earpiece 14' through the first end 1 and conduit C of body B, with the frame F situated generally adjacent to the front side 3 of body B until the hinge 17 or end of frame communicates with arcs 11, 11', and allowing same to direct the frame to be supported at point 12, at generally the center of the front side 3, with earpiece of temple bar 14 passing through the body. Also, ideally, the second earpiece 27 is folded to be juxtaposed between body B and frame F.

In this supported position, the present unit can safely support the eyeglasses in such a manner as to prevent scratching of lens L, the present design supporting the glasses even in considerable rocking movement 18, as when a vehicle turns, or vertical movement 19, as when a vehicle hits an obstacle.

Referring to FIG. 8, to remove the glasses, the user would merely grasp the frames F and lift 21, removing temple bar 14 from the conduit, and the frame end and hinge 17 from the support, freeing the glasses for use.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. The method of supporting a pair of eyeglasses having a frame having first and second eyepieces, first and second temple bars having first and second ends, said first end of the first and second temple bars hingedly attached to the first and second endpieces, respectively, the second ends of the first and second temple bars terminating in first and second earpieces, respectively, the method comprising the steps of:

a. providing an eyeglass receptacle having a main body having a length and a width, said length greater than said width, a first end, a second end, a first side, a second side, a first edge, a second edge, and a longitudinal axis, said main body having formed therein a conduit through the length of said main body;

said first side of said main body having formed therein, adjacent to said first end, an engagement area configured to receive and retain various size and configuration eyewear, said engagement area including first and second, spaced vertical edges having first and second ends, said spaced vertical edges communicating with centering means for centering an item to be supported by said eyewear receptacle in a central support point aligned with said longitudinal axis of said main body;

b. placing the earpiece of the first temple bar of a pair of eyeglasses through said conduit formed in said main body via said first end;

c. lowering the first temple bar, while positioning the frame adjacent to said first side of said body, until the first end of the first temple bar communicates with said centering means formed on said main body, thereby supporting the eyeglasses, with said conduit enveloping a portion of the first temple bar, and the second end of the first temple bar protruding through said conduit;

e. allowing said centering means formed on said main body to urge the eyeglasses to said central support point below said first end of said main body, supporting the eyeglasses generally along said longitudinal axis of said main body.

2. The method of claim 1, wherein there is further included after providing the eyeglass receptacle the additional step of providing an adhesive strip to said second side of said main body, exposing an adhesive on said adhesive strip, and placing said adhesive in contact with a generally vertical support surface, supporting said main body against said support surface.

3. The method of supporting a pair of eyeglasses having a frame having first and second eyepieces, first and second temple bars having first and second ends, said first end of the first and second temple bars hingedly attached to the first and second endpieces, respectively, the second ends of the first and second temple bars terminating in first and second earpieces, respectively, the method comprising the steps of:

a. providing an eyeglass receptacle having a main body having a length and a width, said length greater than said width, a first end, a second end, a first side, a second side, a first edge, a second edge, and a longitudinal axis, said main body having formed therein a conduit through the length of said main body;

said first side of said main body having formed therein, adjacent to said first end, an engagement area configured to receive and retain various size and configuration eyewear, said engagement area including first and second, spaced vertical edges having first and second ends, said spaced vertical edges communicating with centering means for centering an item to be supported by said eyewear receptacle in a central support point aligned with said longitudinal axis of said main body;

b. mounting said second side of said main body of said eyeglass receptacle to a support surface, such that said longitudinal axis of said main body is situated in a generally vertical position, and said first end of said body is situated above said second end of said body;

c. placing the earpiece of the first temple bar of a pair of eyeglasses through said conduit formed in said main body via said first end;

d. lowering the first templebar, while positioning the frame adjacent to said first side of said body, until the first end of the first temple bar communicates with said centering means formed on said main body, thereby supporting the eyeglasses, with said conduit enveloping a portion of the first temple bar, and the second end of the first temple bar protruding through said conduit;

e. allowing said centering means formed on said main body to urge the eyeglasses to said central support point below said first end of said main body, supporting the eyeglasses generally along said longitudinal axis of said main body.

4. The method of claim 3, wherein the mounting step further includes providing an adhesive strip to said second side of said main body, exposing an adhesive on said adhesive strip, and placing said adhesive in contact with a generally vertical support surface, supporting said main body against said support surface.

* * * * *